US010607606B2

(12) United States Patent
Nicholson et al.

(10) Patent No.: US 10,607,606 B2
(45) Date of Patent: Mar. 31, 2020

(54) SYSTEMS AND METHODS FOR EXECUTION OF DIGITAL ASSISTANT

(71) Applicant: Lenovo (Singapore) Pte. Ltd., New Tech Park (SG)

(72) Inventors: John Weldon Nicholson, Cary, NC (US); Daryl Cromer, Cary, NC (US); Mir Farooq Ali, Rolling Meadows, IL (US); David Alexander Schwarz, Morrisville, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 13 days.

(21) Appl. No.: 15/626,831

(22) Filed: Jun. 19, 2017

(65) Prior Publication Data
US 2018/0366116 A1 Dec. 20, 2018

(51) Int. Cl.
*G06F 3/16* (2006.01)
*G10L 15/18* (2013.01)
*G10L 15/22* (2006.01)
*G06F 17/30* (2006.01)
*G10L 15/30* (2013.01)
*G10L 15/32* (2013.01)

(52) U.S. Cl.
CPC ............ *G10L 15/22* (2013.01); *G06F 3/167* (2013.01); *G10L 15/30* (2013.01); *G10L 15/32* (2013.01); *G10L 2015/223* (2013.01)

(58) Field of Classification Search
CPC ......... G10L 17/22; G10L 15/22; G10L 15/18; G06F 3/16; H04N 21/422
USPC .............................................. 704/275; 725/43
See application file for complete search history.

(56) References Cited

U.S. PATENT DOCUMENTS 5,598,534 A   1/1997  Haas
5,839,106 A   11/1998 Bellegarda
(Continued)

FOREIGN PATENT DOCUMENTS

WO    WO-2018005334 A1 * 1/2018 ............. G10L 15/22

OTHER PUBLICATIONS

Russell Speight Vanblon, "Hybrid Speech Recognition", file history of related U.S. Appl. No. 13/314,533, filed Dec. 8, 2011 now U.S. Pat. No. 9,620,122 issued Apr. 11, 2017.

*Primary Examiner* — Seong-Ah A Shin
(74) *Attorney, Agent, or Firm* — John M. Rogitz; John L. Rogitz

(57) ABSTRACT

In one aspect, a first device includes a processor and storage accessible to the at least one processor. The storage bears instructions executable by the processor to execute a digital assistant, receive input for the digital assistant to perform a task, determine the task indicated in the input, determine whether to use a second device for processing the input based on the determination of the task at the first device, and transmit at least a portion of the input to the second device. The instructions are also executable by the processor to, responsive to a determination to not use the second device for processing the input, execute the task at the first device and using the digital assistant without receiving a response from the second device. Responsive to a determination to use the second device for processing the input, the instructions are executable by the processor to wait at least a threshold amount of time for a response from the second device to the transmission of at least the portion of the input.

20 Claims, 8 Drawing Sheets

(56) References Cited

U.S. PATENT DOCUMENTS

| | | |
|---|---|---|
| 6,292,779 B1 | 9/2001 | Wilson et al. |
| 6,385,586 B1 | 5/2002 | Dietz |
| 6,418,199 B1 | 7/2002 | Perrone |
| 6,915,258 B2 | 7/2005 | Kontonassios |
| 7,003,463 B1 * | 2/2006 | Maes ................ H04L 29/06027 704/231 |
| 7,113,173 B1 | 9/2006 | Bi et al. |
| 8,196,066 B1 | 6/2012 | Ouyang et al. |
| 8,401,293 B2 | 3/2013 | Antonijevic et al. |
| 8,630,685 B2 | 1/2014 | Schrage |
| 8,972,263 B2 * | 3/2015 | Stonehocker ........... G10L 15/30 704/251 |
| 9,135,809 B2 | 9/2015 | Chang et al. |
| 9,620,122 B2 | 4/2017 | VanBlon |
| 9,754,591 B1 * | 9/2017 | Kumar .................. G10L 17/005 |
| 10,271,093 B1 * | 4/2019 | Jobanputra ......... G06F 16/3329 |
| 2002/0133341 A1 | 9/2002 | Gillick et al. |
| 2003/0120486 A1 | 6/2003 | Brittan et al. |
| 2003/0122802 A1 | 7/2003 | Bryborn |
| 2003/0212559 A1 | 11/2003 | Xie |
| 2004/0267528 A9 | 12/2004 | Roth et al. |
| 2005/0010411 A1 | 1/2005 | Rigazio et al. |
| 2005/0071163 A1 | 3/2005 | Aaron et al. |
| 2005/0131686 A1 | 6/2005 | Yamamoto et al. |
| 2005/0136955 A1 | 6/2005 | Mumick et al. |
| 2005/0147301 A1 | 7/2005 | Wang et al. |
| 2005/0152602 A1 | 7/2005 | Chen et al. |
| 2006/0009980 A1 | 1/2006 | Burke et al. |
| 2006/0259294 A1 | 11/2006 | Tashereau |
| 2007/0156411 A1 | 7/2007 | Burns et al. |
| 2007/0271087 A1 | 11/2007 | Slavik et al. |
| 2007/0286486 A1 | 12/2007 | Goldstein |
| 2008/0059188 A1 | 3/2008 | Konopka et al. |
| 2008/0167028 A1 | 7/2008 | Gintz |
| 2008/0170785 A1 | 7/2008 | Simmons et al. |
| 2008/0235023 A1 | 9/2008 | Kennewick et al. |
| 2009/0204409 A1 | 8/2009 | Mozer et al. |
| 2009/0204410 A1 | 8/2009 | Mozer et al. |
| 2009/0259473 A1 | 10/2009 | Chang et al. |
| 2009/0312972 A1 | 12/2009 | Muller et al. |
| 2010/0082343 A1 | 4/2010 | Levit et al. |
| 2010/0256978 A1 | 10/2010 | Rosenbaum |
| 2011/0010170 A1 | 1/2011 | Burns et al. |
| 2011/0015928 A1 | 1/2011 | Odell et al. |
| 2011/0112827 A1 * | 5/2011 | Kennewick ............. G10L 15/18 704/9 |
| 2011/0184730 A1 | 7/2011 | Lebeau et al. |
| 2011/0320353 A1 | 12/2011 | Mehew et al. |
| 2012/0215543 A1 | 8/2012 | Öz et al. |
| 2012/0253798 A1 | 10/2012 | Walters et al. |
| 2012/0259627 A1 | 10/2012 | Willett et al. |
| 2012/0299701 A1 | 11/2012 | Zou et al. |
| 2012/0308209 A1 | 12/2012 | Zaletel |
| 2013/0030804 A1 | 1/2013 | Zavaliagkos et al. |
| 2013/0072280 A1 | 3/2013 | Yacenda |
| 2013/0073293 A1 * | 3/2013 | Jang ........................ G10L 15/22 704/275 |
| 2013/0080177 A1 | 3/2013 | Chen |
| 2013/0125168 A1 * | 5/2013 | Agnihotri ............... G10L 15/22 725/38 |
| 2013/0325484 A1 * | 12/2013 | Chakladar ............... G06F 3/167 704/275 |
| 2013/0346078 A1 * | 12/2013 | Gruenstein ............. G10L 15/26 704/235 |
| 2014/0304418 A1 * | 10/2014 | Torok .................... H04L 67/142 709/228 |
| 2015/0142447 A1 * | 5/2015 | Kennewick ......... G10L 15/1822 704/275 |
| 2015/0162006 A1 * | 6/2015 | Kummer ................ G05B 15/02 704/275 |
| 2015/0199320 A1 | 7/2015 | Ho et al. |
| 2015/0348554 A1 * | 12/2015 | Orr ........................ G06F 3/167 704/275 |
| 2015/0382047 A1 * | 12/2015 | Van Os ................... G06F 16/73 725/38 |
| 2016/0029085 A1 * | 1/2016 | Mountain .......... H04N 21/4583 725/43 |
| 2016/0163315 A1 * | 6/2016 | Choi ...................... G10L 15/22 704/275 |
| 2016/0217795 A1 * | 7/2016 | Lee ........................ G10L 15/32 |
| 2016/0351200 A1 * | 12/2016 | Sung ....................... H04L 67/42 |
| 2017/0068423 A1 * | 3/2017 | Napolitano ........... G06F 16/438 |
| 2018/0096072 A1 * | 4/2018 | He ......................... G06F 3/0481 |
| 2019/0027130 A1 * | 1/2019 | Tsunoo ............... G06F 17/2735 |

* cited by examiner

700 ↘

```
OKAY JOHN, THE ANSWER IS... ~702
(FETCHING...) ~704
```

```
...73 DEGREES IN RALEIGH ~802
(LOCAL RESULT, PRE-FETCHED 17 MIN AGO) ~804
        806~ [ WAIT FOR/ SET WEB RESULT ]
```

```
            CORRECTION! ~902
75 DEGREES IN RALEIGH ~904
(30 SECONDS AGO) ~906
```

SETTINGS

❑ ENABLE HYBRID ASSISTANCE ~1002

❑ ONLY GET REMOTE ASSISTANCE IF LOCAL CONFIDENCE IS BELOW CONFIDENCE THRESHOLD ~1004

❑ USE FILLER WORDS ~1006

❑ RAISE CONFIDENCE THRESHOLD BASED ON SUCCESSFUL LOCAL IDs ~1008

❑ INDICATE CONFLICTS/ CORRECTIONS ~1010

VARY WAIT TIME FOR RESPONSE FROM SERVER BASED ON:

❑ SIGNAL STRENGTH ~1012

❑ CONFIDENCE LEVEL ~1014

❑ FETCH PREDICTED OUTPUTS IN ADVANCE ~1016

❑ LIMIT PRE-FETCHING BASED ON DATA DOWNLOAD LIMIT FOR DEVICE ~1018

FIG. 10

SYSTEMS AND METHODS FOR EXECUTION OF DIGITAL ASSISTANT

BACKGROUND

As recognized herein, digital assistants sometimes use web-based intelligence when attempting to provide an output in response to a user's audible input. However, when service is unavailable for connection to the web-based intelligence, a timeout can occur and, unfortunately for the user, no output will be provided.

As also recognized herein, some devices do not use any web-based intelligence at all but instead execute the digital assistant based only on local results from the device itself. However, these local results can sometimes be more inaccurate than had web-based intelligence been used.

There are currently no adequate solutions to the foregoing computer-related, technological problems related to digital assistants executing at smart devices.

SUMMARY

Accordingly, in one aspect a first device includes at least one processor and storage accessible to the at least one processor. The storage bears instructions executable by the at least one processor to execute a digital assistant, receive input for the digital assistant to perform a task, and determine the task indicated in the input at the first device based on the input. The instructions are also executable by the at least one processor to determine whether to use a second device for processing the input based on the determination of the task at the first device, with the second device being different from the first device. Still further, the instructions are executable by the at least one processor to transmit at least a portion of the input to the second device and, responsive to a determination to not use the second device for processing the input, execute the task at the first device and using the digital assistant without receiving a response from the second device. Responsive to a determination to use the second device for processing the input, the instructions are executable by the at least one processor to wait at least a threshold amount of time for a response from the second device to the transmission of at least the portion of the input.

In another aspect, a method includes executing a personal assistant application at a first device, receiving audible input for the personal assistant application to execute a function, and determining the function indicated in the audible input at the first device and based on the audible input. The method also includes determining whether to use a second device for processing the input based on the determining at the first device of the function, with the second device being different from the first device. The method further includes executing, responsive to determining to not use the second device for processing the input, the function at the first device and using the personal assistant application. The method also includes transmitting at least a portion of the audible input to the second device responsive to determining to use the second device for processing the input and waiting, responsive to the transmitting, at least a threshold amount of time for a response from the second device to the transmitting of at least the portion of the audible input.

In still another aspect, an apparatus includes a first processor, a network adapter, and storage. The storage bears instructions executable by a second processor of a first device for executing a digital assistant, receiving input for the digital assistant to execute a function, determining the function indicated in the input at the first device and based on the input, and transmitting at least a portion of the input to a second device different from the first device. The instructions are also executable for providing one or more filler words as audible output at the first device and waiting at least a threshold amount of time for a response from the second device to the transmitting of at least the portion of the input. Still further, the instructions are executable for beginning to execute the function at the first device and using the digital assistant without receiving a response from the second device. The first processor transfers the instructions to the first device over a network via the network adapter.

The details of present principles, both as to their structure and operation, can best be understood in reference to the accompanying drawings, in which like reference numerals refer to like parts, and in which:

BRIEF DESCRIPTION OF THE DRAWINGS

FIGS. 7-10 are example user interfaces (UIs) in accordance with present principles.

DETAILED DESCRIPTION

Figure 1:
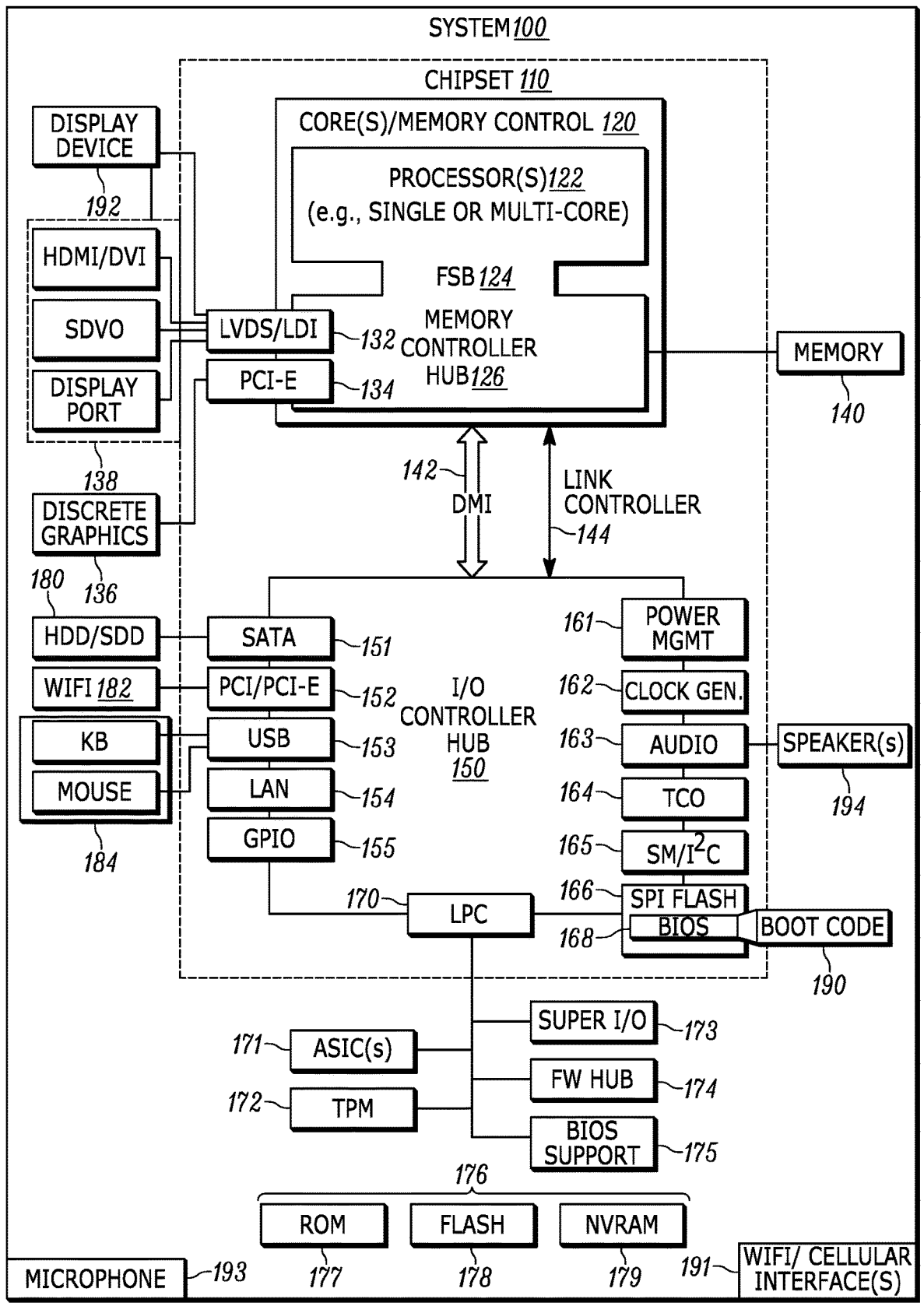
FIG. 1 is a block diagram of an example system in accordance with present principles.

Disclosed herein are devices having local and/or embedded digital assistant capability that can be used when the device is offline, but can also use an online service when it is available. Local can be within a single device, though in some embodiments local can be a collection of devices on a local network.

The present application discloses concurrently using both local and web-based services when possible to combine their effectiveness and maximize their strengths. For instance, if a user asks something which the local/offline service has a high confidence in understanding/handling correctly, the local service can handle the user's request directly and without waiting for the web-based service to respond.

Additionally, the device may include a data caching or pre-fetch mechanism. This mechanism may use historical usage data, and/or related or adjacent data such as contextual data regarding the operation of other devices. This caching and pre-fetch mechanism may be network-aware as well so that, for example, on unmetered connections or on high quality connections, the caching and prefetching mechanism may be performed more aggressively or frequently than when a metered connection is used.

Additionally, the latency of the web service may be masked when the local service has an answer but would still like to wait for a response from the web service (assuming, for example, that a wait time threshold has not been reached). For example, the local service may start a response with pre-scripted filler material such as "Okay", or "Okay [user name]". Thus, if the web response arrives during presentation of the filler material, the web response can be used instead of the local response, and otherwise the local response can be used.

Additionally, an adaptive timeout threshold may be used that is based on confidence and signal quality/anticipated latency. Thus, when the local service has a high confidence, a lower time threshold may be used for waiting for the web service to respond. Additionally, when the signal quality is lower or the anticipated latency from the web service is high, a lower time threshold may be used for waiting for the web service to respond.

Furthermore, in some embodiments the confidence for the local system may be determined not only by its inherent confidence in a given recognition result, but also based on it observing how closely its past responses matched corresponding responses provided by the web-based service over time.

Still further, present principles provide for reversing or undoing the actions that the local service might take before it receives the web-based response if the action that the local service took conflicts with the web-based response. This can optionally involve confirmation of the user, such as providing audible or touch-based input confirming that the user acknowledges a correction that was made based on the conflict.

With respect to any computer systems discussed herein, a system may include server and client components, connected over a network such that data may be exchanged between the client and server components. The client components may include one or more computing devices including televisions (e.g., smart TVs, Internet-enabled TVs), computers such as desktops, laptops and tablet computers, so-called convertible devices (e.g., having a tablet configuration and laptop configuration), and other mobile devices including smart phones. These client devices may employ, as non-limiting examples, operating systems from Apple, Google, or Microsoft. A Unix or similar such as Linux operating system may be used. These operating systems can execute one or more browsers such as a browser made by Microsoft or Google or Mozilla or another browser program that can access web pages and applications hosted by Internet servers over a network such as the Internet, a local intranet, or a virtual private network.

As used herein, instructions refer to computer-implemented steps for processing information in the system. Instructions can be implemented in software, firmware or hardware, or combinations thereof and include any type of programmed step undertaken by components of the system; hence, illustrative components, blocks, modules, circuits, and steps are sometimes set forth in terms of their functionality.

A processor may be any conventional general purpose single- or multi-chip processor that can execute logic by means of various lines such as address lines, data lines, and control lines and registers and shift registers. Moreover, any logical blocks, modules, and circuits described herein can be implemented or performed with a general purpose processor, a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can be implemented by a controller or state machine or a combination of computing devices.

Software modules and/or applications described by way of flow charts and/or user interfaces herein can include various sub-routines, procedures, etc. Without limiting the disclosure, logic stated to be executed by a particular module can be redistributed to other software modules and/or combined together in a single module and/or made available in a shareable library.

Logic when implemented in software, can be written in an appropriate language such as but not limited to C# or C++, and can be stored on or transmitted through a computer-readable storage medium (that is not a transitory, propagating signal per se) such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc.

In an example, a processor can access information over its input lines from data storage, such as the computer readable storage medium, and/or the processor can access information wirelessly from an Internet server by activating a wireless transceiver to send and receive data. Data typically is converted from analog signals to digital by circuitry between the antenna and the registers of the processor when being received and from digital to analog when being transmitted. The processor then processes the data through its shift registers to output calculated data on output lines, for presentation of the calculated data on the device.

Components included in one embodiment can be used in other embodiments in any appropriate combination. For example, any of the various components described herein and/or depicted in the Figures may be combined, interchanged or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

The term "circuit" or "circuitry" may be used in the summary, description, and/or claims. As is well known in the art, the term "circuitry" includes all levels of available integration, e.g., from discrete logic circuits to the highest level of circuit integration such as VLSI, and includes programmable logic components programmed to perform the functions of an embodiment as well as general-purpose or special-purpose processors programmed with instructions to perform those functions.

Now specifically in reference to FIG. 1, an example block diagram of an information handling system and/or computer system 100 is shown that is understood to have a housing for the components described below. Note that in some embodiments the system 100 may be a desktop computer system, such as one of the ThinkCentre® or ThinkPad® series of personal computers sold by Lenovo (US) Inc. of Morrisville, N.C., or a workstation computer, such as the ThinkStation®, which are sold by Lenovo (US) Inc. of Morrisville, N.C.; however, as apparent from the description herein, a client device, a server or other machine in accordance with present principles may include other features or only some of the features of the system 100. Also, the system 100 may be, e.g., a game console such as XBOX®, and/or the system 100 may include a wireless telephone, notebook computer, and/or other portable computerized device.

As shown in FIG. 1, the system 100 may include a so-called chipset 110. A chipset refers to a group of integrated circuits, or chips, that are designed to work together. Chipsets are usually marketed as a single product (e.g., consider chipsets marketed under the brands INTEL®, AMD®, etc.).

In the example of FIG. 1, the chipset 110 has a particular architecture, which may vary to some extent depending on brand or manufacturer. The architecture of the chipset 110 includes a core and memory control group 120 and an I/O controller hub 150 that exchange information (e.g., data, signals, commands, etc.) via, for example, a direct management interface or direct media interface (DMI) 142 or a link controller 144. In the example of FIG. 1, the DMI 142 is a chip-to-chip interface (sometimes referred to as being a link between a "northbridge" and a "southbridge").

The core and memory control group 120 include one or more processors 122 (e.g., single core or multi-core, etc.) and a memory controller hub 126 that exchange information via a front side bus (FSB) 124. As described herein, various components of the core and memory control group 120 may be integrated onto a single processor die, for example, to make a chip that supplants the conventional "northbridge" style architecture.

The memory controller hub 126 interfaces with memory 140. For example, the memory controller hub 126 may provide support for DDR SDRAM memory (e.g., DDR, DDR2, DDR3, etc.). In general, the memory 140 is a type of random-access memory (RAM). It is often referred to as "system memory."

The memory controller hub 126 can further include a low-voltage differential signaling interface (LVDS) 132. The LVDS 132 may be a so-called LVDS Display Interface (LDI) for support of a display device 192 (e.g., a CRT, a flat panel, a projector, a touch-enabled display, etc.). A block 138 includes some examples of technologies that may be supported via the LVDS interface 132 (e.g., serial digital video, HDMI/DVI, display port). The memory controller hub 126 also includes one or more PCI-express interfaces (PCI-E) 134, for example, for support of discrete graphics 136. Discrete graphics using a PCI-E interface has become an alternative approach to an accelerated graphics port (AGP). For example, the memory controller hub 126 may include a 16-lane (×16) PCI-E port for an external PCI-E-based graphics card (including, e.g., one of more GPUs). An example system may include AGP or PCI-E for support of graphics.

In examples in which it is used, the I/O hub controller 150 can include a variety of interfaces. The example of FIG. 1 includes a SATA interface 151, one or more PCI-E interfaces 152 (optionally one or more legacy PCI interfaces), one or more USB interfaces 153, a LAN interface 154 (more generally a network interface for communication over at least one network such as the Internet, a WAN, a LAN, etc. under direction of the processor(s) 122), a general purpose I/O interface (GPIO) 155, a low-pin count (LPC) interface 170, a power management interface 161, a clock generator interface 162, an audio interface 163 (e.g., for speakers 194 to output audio), a total cost of operation (TCO) interface 164, a system management bus interface (e.g., a multi-master serial computer bus interface) 165, and a serial peripheral flash memory/controller interface (SPI Flash) 166, which, in the example of FIG. 1, includes BIOS 168 and boot code 190. With respect to network connections, the I/O hub controller 150 may include integrated gigabit Ethernet controller lines multiplexed with a PCI-E interface port. Other network features may operate independent of a PCI-E interface.

The interfaces of the I/O hub controller 150 may provide for communication with various devices, networks, etc. For example, where used, the SATA interface 151 provides for reading, writing or reading and writing information on one or more drives 180 such as HDDs, SDDs or a combination thereof, but in any case the drives 180 are understood to be, e.g., tangible computer readable storage mediums that are not transitory, propagating signals. The I/O hub controller 150 may also include an advanced host controller interface (AHCI) to support one or more drives 180. The PCI-E interface 152 allows for wireless connections 182 to devices, networks, etc. The USB interface 153 provides for input devices 184 such as keyboards (KB), mice and various other devices (e.g., cameras, phones, storage, media players, etc.).

In the example of FIG. 1, the LPC interface 170 provides for use of one or more ASICs 171, a trusted platform module (TPM) 172, a super I/O 173, a firmware hub 174, BIOS support 175 as well as various types of memory 176 such as ROM 177, Flash 178, and non-volatile RAM (NVRAM) 179. With respect to the TPM 172, this module may be in the form of a chip that can be used to authenticate software and hardware devices. For example, a TPM may be capable of performing platform authentication and may be used to verify that a system seeking access is the expected system.

The system 100, upon power on, may be configured to execute boot code 190 for the BIOS 168, as stored within the SPI Flash 166, and thereafter processes data under the control of one or more operating systems and application software (e.g., stored in system memory 140). An operating system may be stored in any of a variety of locations and accessed, for example, according to instructions of the BIOS 168.

The system 100 may also include one or more communication interfaces 191 for communication between first and second devices as disclosed herein, such as communication between a smart phone and a web-based server. The communication interface(s) 191 may be for Wi-Fi, wireless cellular communication, other wide-area network (WAN) and/or local area network (LAN) communication, Bluetooth communication, etc.

Further, the system 100 may include an audio receiver/microphone 193 that provides input to the processor(s) 122 based on audio that is detected, such as via a user providing audible voice input to the microphone 193 in accordance with present principles.

Additionally, though not shown for clarity, in some embodiments the system 100 may include a gyroscope that senses and/or measures the orientation of the system 100 and provides input related thereto to the processor 122, as well as an accelerometer that senses acceleration and/or movement of the system 100 and provides input related thereto to the processor 122. Still further, the system may include a camera that gathers one or more images and provides input related thereto to the processor 122. The camera may be a thermal imaging camera, a digital camera such as a webcam, a three-dimensional (3D) camera, and/or a camera otherwise integrated into the system 100 and controllable by the processor 122 to gather pictures/images and/or video. Also, the system 100 may include a GPS transceiver that is configured to receive geographic position information from at least one satellite and provide the information to the processor 122. However, it is to be understood that another suitable position receiver other than a GPS receiver may be used in accordance with present principles to determine the location of the system 100.

It is to be understood that an example client device or other machine/computer may include fewer or more features than shown on the system 100 of FIG. 1. In any case, it is to be understood at least based on the foregoing that the system 100 is configured to undertake present principles.

Figure 2:
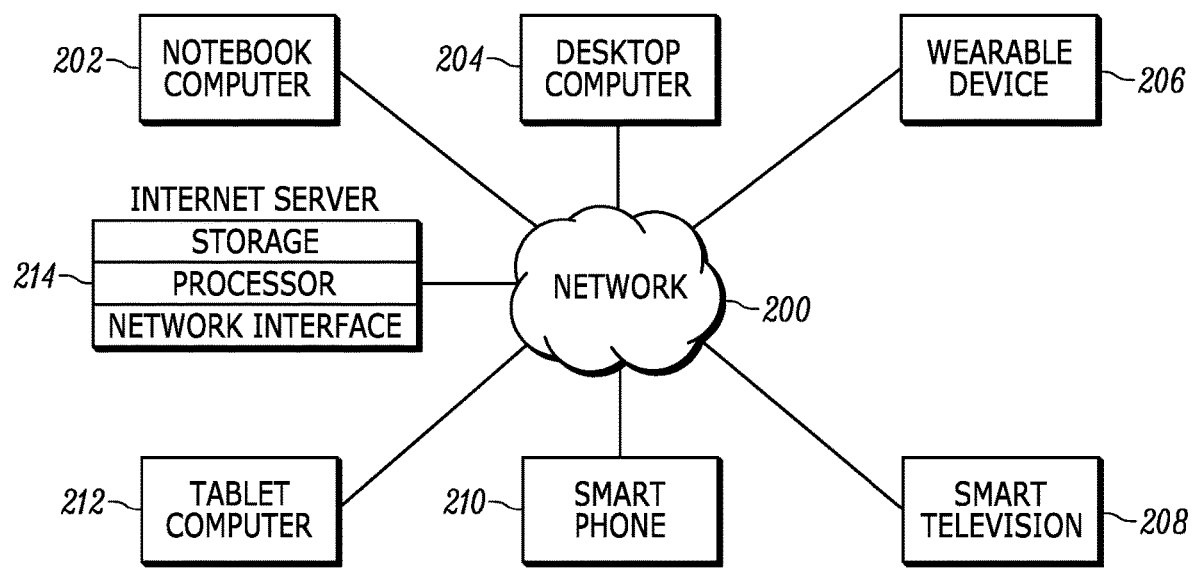
FIG. 2 is a block diagram of an example network of devices in accordance with present principles.

Turning now to FIG. 2, example devices are shown communicating over a network 200 such as the Internet in accordance with present principles. It is to be understood that each of the devices described in reference to FIG. 2 may include at least some of the features, components, and/or elements of the system 100 described above.

FIG. 2 shows a notebook computer and/or convertible computer 202, a desktop computer 204, a wearable device 206 such as a smart watch, a smart television (TV) 208, a smart phone 210, a tablet computer 212, and a server 214 such as an Internet server that may provide cloud storage accessible to the devices 202-212 and also provide assistance to a digital/personal assistant executing at one or more of the other devices 202-212 in accordance with present principles. It is to be understood that the devices 202-214 are configured to communicate with each other over the network 200 to undertake present principles.

Figure 3:
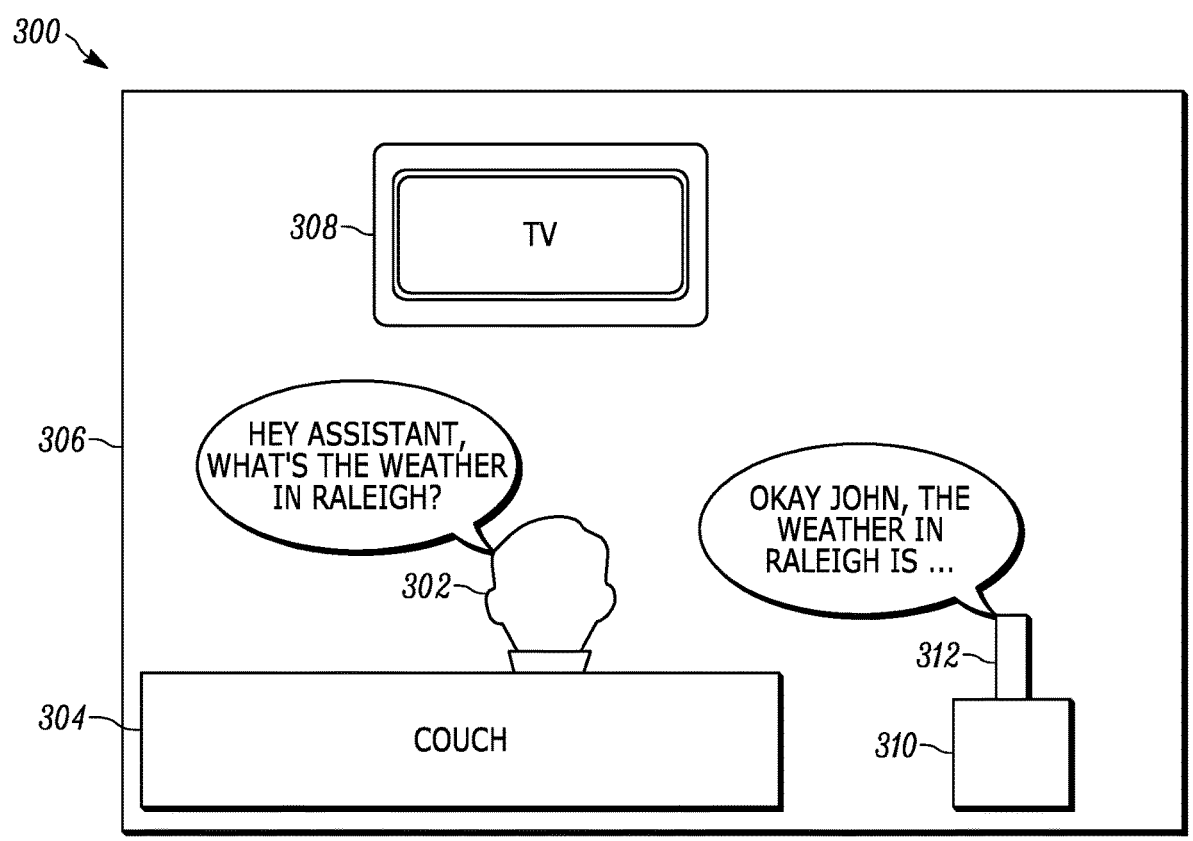
FIGS. 3-5 are example illustrations in accordance with present principles.
Figure 4:
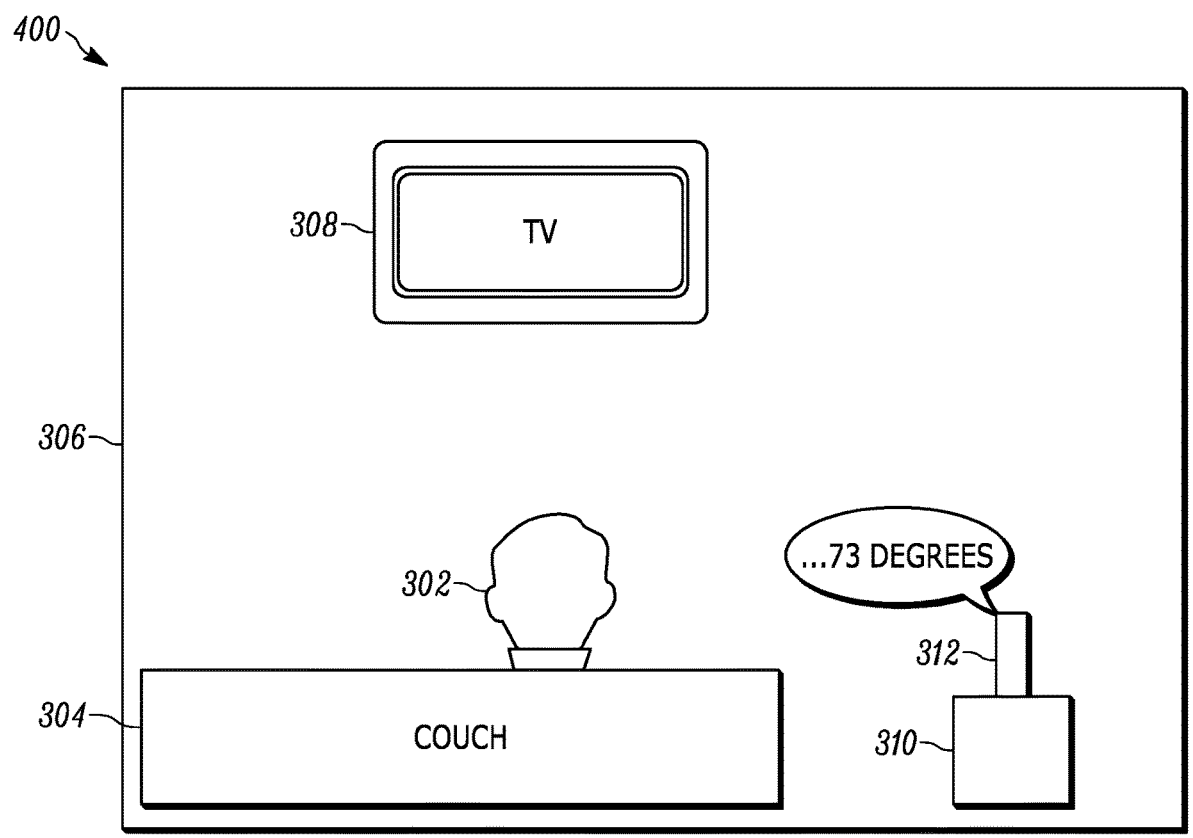
Figure 5:
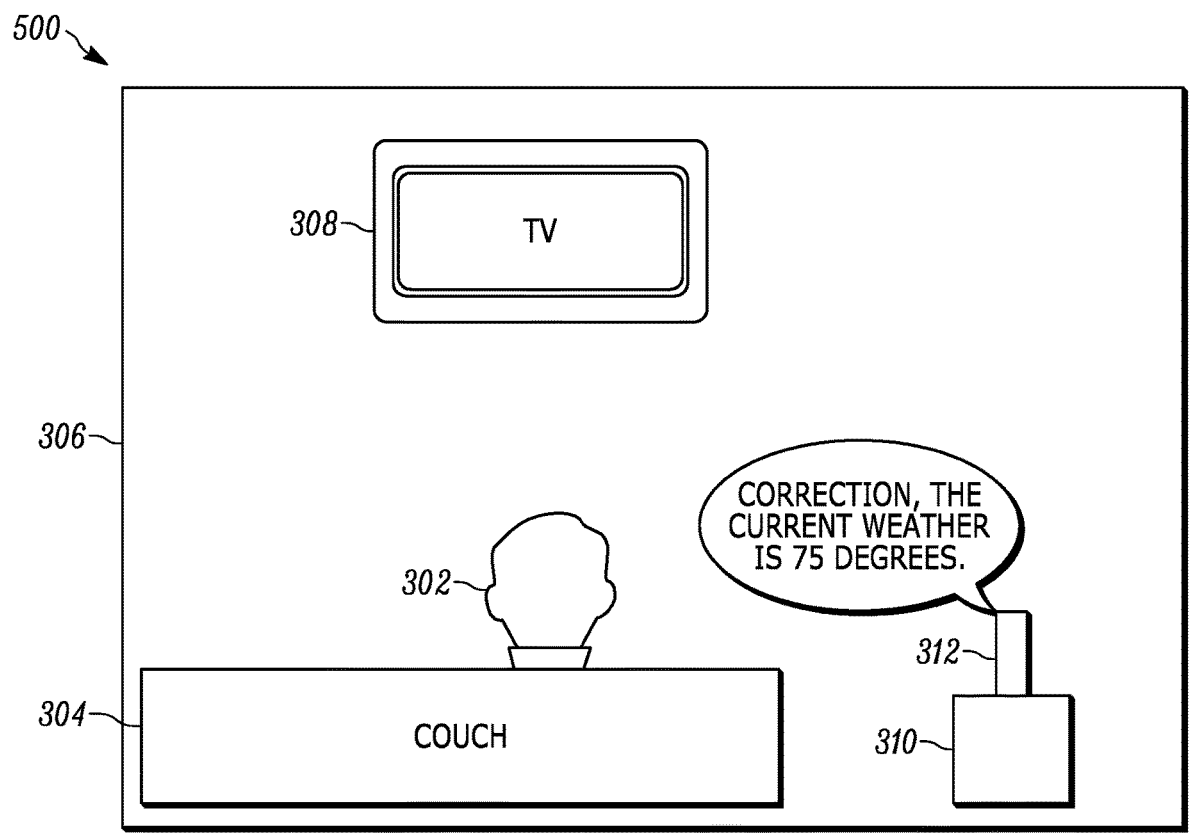

Referring to FIGS. 3-5, they show example illustrations 300, 400, and 500 in accordance with present principles. In all three, a user 302 is sitting on a couch 304 in a living room 306 of the user's personal residence and watching audio video content presented on a television 308. Also shown in all three illustrations is a table 310 on which a stand-alone digital/personal assistant device 312 is disposed, with the device 312 executing a digital/personal assistant application to present results to questions from the user 302 both that are determined at the device 312 alone and that are determined based on communication with a second device such as a remotely located web-based server. In some embodiments, the device 312 may be a Lenovo Smart Assistant sold by Lenovo (US) Inc. of Morrisville, N.C.

As may be appreciated from FIG. 3, the user 302 provides voice input the device 312, including a predetermined response cue that indicates to the assistant that input is about to be provided on which the assistant is to act. In this case, the response cue is "Hey assistant." The user 302 also provides voice input of a request for information, which in the example shown is a request for the current weather in Raleigh, N.C.

In response to the voice input from the user, the device 312 may determine the request being asked of it from the user and evaluate a confidence in the request it determined. The device 312 may then provide an output based on data stored locally at the device 312 itself and/or transmit the voice input and/or corresponding request to the remotely-located web-based server for an answer from the server. It is to be understood that in this example, confidence on the part of the device 312 to know the current weather for Raleigh is not that high owing to weather conditions constantly changing. Thus, as also shown in FIG. 3, in response to the voice input and while the device 312 transmits the voice input/request to the server, the device 312 may provide audible output of one or more filler words that make it seem to the user that a seamless audio output is being provided even though the device 312 is waiting for an answer from the server. In this case, the filler words include two acknowledgements of the task of outputting weather information ("okay" and "the weather in Raleigh is") along with a name of the user 302 (John, in this case) as might have been assumed or identified based on voice recognition or facial recognition or some other method of identifying the user.

As shown in the illustration 400 of FIG. 4, a response from the server has not yet been received. Accordingly, based on the filler words having been provided without the device 312 receiving a response during the time it provided the filler words, the device 312 outputs a response of "73 degrees" based on weather data for Raleigh, N.C. that it had fetched and stored at the device 312 prior to receiving the user's request for the information. Pre-fetching data may be performed based on, for example, a history of previous requests for information (e.g., stored at the device 312), a user that made the previous requests, and/or times at which the requests were made to predict what requests might be made in the future under similar circumstances.

Then, as shown in the illustration 500 of FIG. 5, the device 312 has received a response from the server subsequent to outputting the locally-stored, pre-fetched result. Because the device 312 has determined that the response from the server conflicts with (e.g., is different than) the output it previously provided based on the pre-fetched information, the device 312 issues a correction. In this case, the audio output of the correction includes an indication of the correction itself (e.g., audio output of the word "correction"), along with an indication of the current weather in Raleigh, N.C. as received from the server ("the current weather is 75 degrees").

Figure 6:
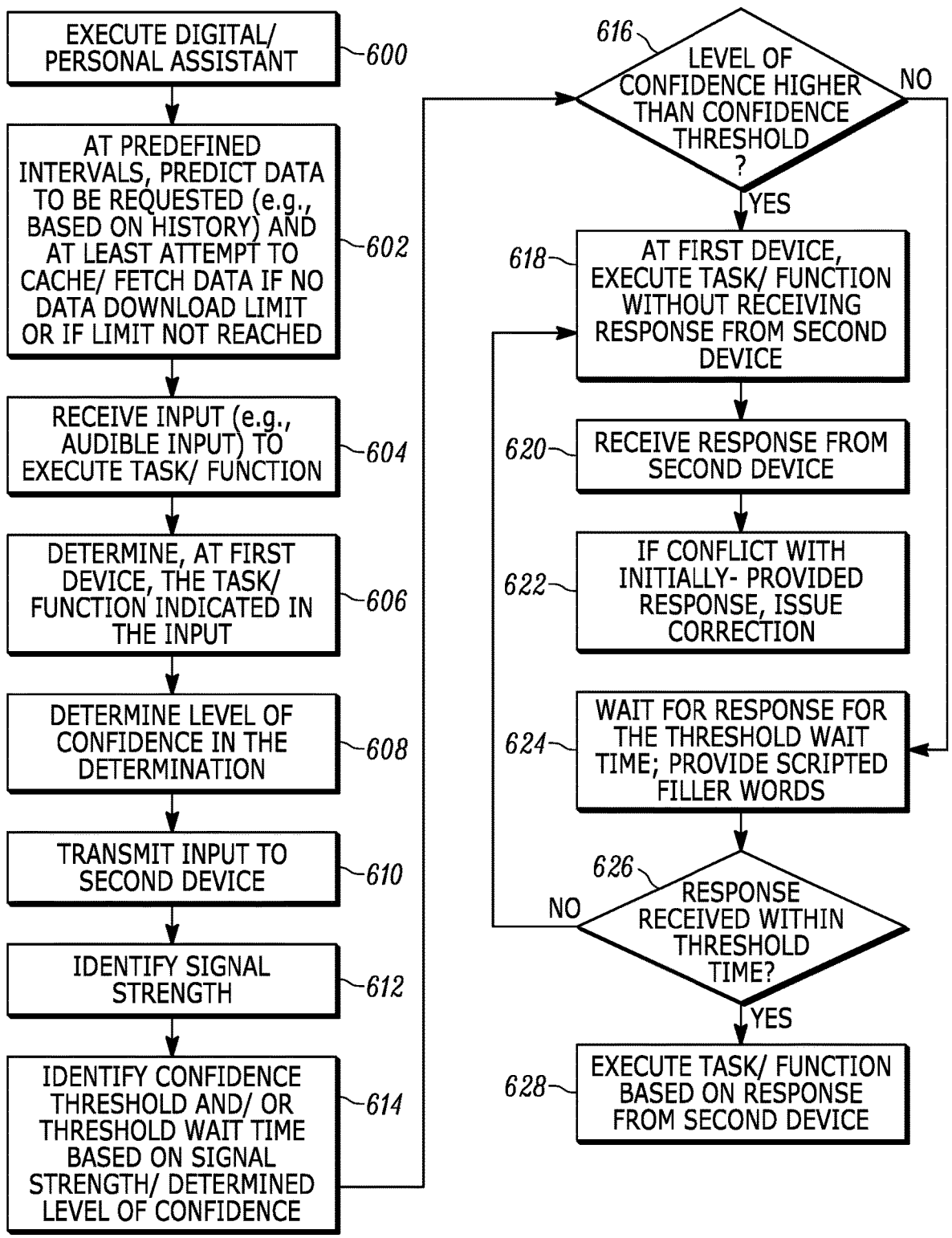
FIG. 6 is a flow chart of an example algorithm in accordance with present principles.

Now in reference to FIG. 6, it shows example logic that may be executed by a first device such as the system 100 in accordance with present principles. Beginning at block 600, the first device may execute a digital/personal assistant application using at least one processor on the first device. The logic may then move to block 602. At block 602 the first device may access a history of previous user requests to the digital assistant to determine/predict data that might be requested again. For instance, the history may indicate which particular users have made certain requests a threshold number of times in the past, and based on the threshold being met for a particular request and the digital assistant again identifying the same user as being present, the digital assistant may predict that a certain request may be submitted by the same user at a same time of day/time range as in past instances. The predicting may be performed at predefined intervals, such as every minute, every half hour, or every hour, and users may be identified using facial or voice recognition or assumed based on one user in particular being associated with the first device. The history itself may be stored locally in storage of the first device.

Then, also at block 602 and based on the prediction, the digital assistant may transmit a request to a second device (e.g., an Internet-based server) for information that satisfies with the predicted request, and then receive and cache the information as received from the second device (such as current weather information in the example above for FIGS. 3-5). Note that even though poor cellular data signal quality or no network connectivity might prevent the first device from successfully transmitting the request or promptly receiving a response back from the second device each time a request is made (or even receive a response at all), the first device may at least attempt to get predicted information at the predefined intervals.

However, it is to be further understood that in addition to or in lieu of making predictions and requests at predefined intervals, the predicting and/or requesting itself may be performed at set times that are threshold times before other times that respective requests are predicted to be received from a user, as might have been previously established by the first device based on a prior analysis of the history. Additionally, requests need not be transmitted at all if, as a result of a prediction, the first device determines that no information is likely to be requested by a user during a certain interval or that a sufficient prediction cannot be made. So, for instance, the device might be set to request current weather information at 8:55 a.m. every day after having already predicted that a certain user has previously asked a threshold number of times for weather information between 9:00 a.m. and 9:15 a.m. But, at other times of day the first device may not transmit requests for current weather information to a second device based on a prediction alone but instead may only do so if asked by a user.

Last, before moving on in the detailed description to block 604, it is to be understood that in some embodiments the predicting and/or requests to the second device may only be performed if the device determines that it may use an unmetered Internet connection such as an unlimited data download Wi-Fi connection. Additionally or alternatively, the predicting and/or requests to the second device may only be performed if the device determines that it may use a metered Internet connection and that a download limit for the metered Internet connection has not been reached (e.g., a monthly data download limit associated with the first device or wireless cellular account of the user, as set by a wireless cellular provider of the Internet connection).

Still in reference to FIG. 6, from block 602 the logic may proceed to block 604. At block 604 the first device may receive input, such as audible input or keyboard input, to execute a function or task using the digital assistant executing at the first device. After block 604 the logic may proceed to block 606 where the first device may attempt to recognize the input and determine a task or function requested of the digital assistant in the input. For instance, if the first input were audible input, voice recognition may be attempted in order to determine what particular task/information is being requested in the audible input (such as a search for a particular piece of information). The determination performed at block 606 may be performed using only resources (e.g., applications and data) stored at and available to the first device.

From block 606 the logic may proceed to block 608. At block 608 the logic may determine a level of confidence in the determination it performed at block 606. Confidence may be determined using voice/speech recognition software and/or an adaptive learning module that learns from correct voice recognitions it has performed in the past and incorrect voice recognitions it has performed in the past that the user subsequently modified, so that the assistant may become increasingly confident as it learns a user's accent, speech patterns, etc.

As an example of determining confidence in certain speech by the user, blocks or segments within the audio signal of the user's speech (as received from a microphone on the first device) may be parsed by the first device to identify word boundaries. The bounded words themselves may then be analyzed by the first device for identification of phonemes indicative of particular words. Particular words corresponding to the speech may then be identified based on a confidence metric, e.g., confidence of match to a known word or words based on characteristics within the audio signal. The confidence metric itself may be a percent of confidence on a scale from zero to one hundred, or another type such as a scale from one to ten.

Additionally, in some embodiments confidence may be pre-set to be low for certain word(s) that include a predetermined sound characteristic associated with ambiguity, e.g., certain consonant sounds. Also, confidence may be pre-set to a high or low level for certain types of requests.

After a level of confidence is determined, the logic may move from block 608 to block 610. At block 610 the first device may transmit the input received at block 604 to the second device so that the second device may also perform a determination similar to the one performed by the first device at block 606 and even a determination similar to the one performed by the first device at block 608. For example, the second device may also recognize voice input, evaluate its confidence in the voice input, and determine a task or function requested in the voice input.

From block 610 the logic may then move to block 612 where the first device may identify a strength of one or more signals between the first and second devices, the strength of a data service over which the first device may communicate with the second device, and/or the speed of communication between the first device and the second device. Thus, the strengths/speed may pertain to strength/speed of wireless cellular telephone and/or data signals, strength/speed of a Wi-Fi signal, strength/speed of a wireless LAN signal, etc. The strength/speed may be identified based on input from a communication interface on the first device that indicates the strength/speed of communications sent/received using the communication interface.

From block 612 the logic may proceed to block 614 where the first device may identify one or more of a confidence threshold and a threshold wait time. In some embodiments the threshold wait time may be the same regardless of any conditions that may be present. In these embodiments, data indicating the threshold wait time may simply be stored locally at the first device and accessed at block 614. It may be the "same" in that it may be the same length of time regardless or the "same" in that the threshold wait time may only be for the amount of time it takes the first device to output filler words such as audio acknowledgement of the input and an indication of the user's name (however long the name might be).

In still other embodiments, the threshold wait time may be identified based on one or both of the signal strength/speed identified at block 612 and the level of confidence identified at block 608. A relational database that correlates signal strengths and/or confidence levels with corresponding threshold wait times may be stored at or otherwise accessible to the first device so that, once one or both of signal strength and level of confidence are identified, the first device may access the relational database and parse its entries until it locates a matching signal strength/level of confidence entry to thereby identify the corresponding threshold wait time for that entry. This may be done so that, for example, where low signal strength would result in a slow response from the second device, or when the first device has a relatively high confidence in what it determined from the user's input, the first device may simply execute the task or function without receiving a response from the second device and not wait as long as it might otherwise wait under other conditions.

For the confidence threshold, in some embodiments it may be the same regardless of any conditions that may be present. In these embodiments, data indicating the confidence threshold may simply be stored locally at the first device and accessed at block 614.

Alternatively, in embodiments where the confidence threshold varies it may be determined based on signal strength so that, for lower signal strengths, lower confidence thresholds may be used. Signal strength(s) or strength ranges may be correlated to respective confidence thresholds in a relational database that is stored at or otherwise accessible to the first device. Thus, when signal strength is relatively low, the digital assistant may use voice input recognized at the first device alone to execute a task even if the level of confidence in the recognition is relatively low, since waiting for a voice recognition response from the second device may take a relatively lengthy amount of time owing to the poor signal strength and hence be undesirable.

A confidence threshold may also be determined based on a determined confidence in a particular result as well. For instance, confidence above 90% for any particular user request may result in a 90% confidence threshold being used, while any confidence for a particular user request below 90% may result in a 70% confidence threshold being used.

Still in reference to FIG. 6, from block 614 the logic may proceed to decision diamond 616. At diamond 616 the logic may determine whether the level of confidence determined at block 608 is higher than the confidence threshold. An affirmative determination at diamond 616 may cause the logic to proceed to block 618. At block 618 the logic may, at the first device, use the (e.g., voice) recognition result derived from the (e.g., voice) input received at block 604 to execute a task or function using the first device and without receiving a response from the second device to the transmission sent at block 610.

For example, if the determined level of confidence from block 608 is high (and hence above the confidence threshold) because a user has asked for information that already has been pre-fetched by the first device based on a prediction made at block 602, at block 618 the first device may output the pre-fetched information to the user without receiving a response from the second device (such as in the current weather information example from above). As another example if the determined level of confidence from block 608 is high (and hence above the confidence threshold) based on a user's voice input history for asking the current time of day, at block 618 the first device may access a clock application executing at the first device and audibly output the current time of day without confirming the current time of day with the second device. As yet another example, if the determined level of confidence from block 608 is high (and hence above the confidence threshold) that a user has asked that volume be turned up for music being played from the first device or another device within the first device's LAN, at block 618 the first device may execute the volume up command without exchanging communications with the second device or caching anything received from another device.

From block 618 the logic may proceed to block 620. At block 620 the first device may still receive a response from the second device to the transmission sent at block 610, even if it has already executed the task/function or at least begun to execute the task/function. The logic may then proceed to block 622 where the first device may determine if there is a conflict (e.g., inconsistency) in the voice input as recognized at the first device and the voice input as recognized by the second device, and/or if there is a conflict between the function/task that the first device determines based on the input and the function/task that the second device determines based on the input. If a conflict exists, at block 622 the first device may issue a correction to the function/task it performed at block 618. If execution of the task is ongoing, the first device may wait until it is completed (as initially started at block 618) to issue the correction, or the first device may cease performing the task/function as initially started at block 618 and correct itself mid-task to begin performing the task/function according to the response from the second device instead.

Still in reference to FIG. 6, note that if a negative determination rather than an affirmative one is made at diamond 616, the logic may instead proceed from diamond 616 to block 624. At block 624 the first device may wait for a response from the second device for at least the threshold wait time determined at block 614. Also at block 624, while the waiting is performed the first device may also output scripted filler words or word sequences as disclosed herein. From block 624 the logic may proceed to decision diamond 626.

At diamond 626 the logic may determine whether a response from the second device has been received within the threshold time. A negative determination at diamond 626 may cause the logic to move to block 618 and proceed therefrom based on the threshold time expiring without receiving a response from the second device. However, an affirmative determination at diamond 626 may instead cause the logic to proceed to block 628. At block 628 the first device may execute the task/function requested by the user based on the response from the second device (e.g., based on a voice recognition result from the second device and/or data provided by the second device in conformance with the user's request).

Now in reference to FIGS. 7-9, they show example user interfaces (UIs) 700, 800, and 900 that may be presented on a display in addition to or in lieu of audio output from a first device as disclosed herein. FIGS. 7-9 pertain to the same example as FIGS. 3-5 in that they deal with a user request for current weather information.

Beginning with the UI 700 at FIG. 7, one or more filler words 702 may be progressively presented on the display over time (and even read aloud by the first device). The UI 700 may also include an indication 704 that it is waiting for a response from a second device with which it is communicating to satisfy the user's request.

Then, as shown on the UI 800 of FIG. 8, once the filler words have been provided the first device may output pre-fetched information 802 satisfying the request. In this case, the pre-fetched information indicates a current temperature in Raleigh, N.C. of seventy three degrees Fahrenheit. The UI 800 may also include an indication 804 that the information 802 was identified locally at the first device and that the information 802 was pre-fetched at a certain time (e.g., the time the pre-fetched data was received from the second device). The UI 800 may also include a selector 806 that is selectable by the user (e.g., based on touch input) to input a command to the first device to communicate with the second device to output a response to the user's request based on data to be received from the second device rather than pre-fetched data.

Then, responsive to updated weather information being received at the first device subsequent to presentation of the UI 800 and/or based on selection of selector 806, the first device may output a correction 902 via the UI 900 of FIG. 9. Thus, the correction 902 may indicate information 904 satisfying the user's request as received from the second device, which in this case is information indicating that the current temperature in Raleigh, N.C. is seventy five degrees. Still further, an indication 906 may be presented on the UI 900 that indicates a time at which the information 904 was received from the second device.

Continuing the detailed description in reference to FIG. 10, it shows an example settings UI 1000 that may be presented on a display of a first device as disclosed herein for configuring settings of a digital assistant/first device in accordance with present principles. Each option to be discussed below may be selected using the respective check box shown adjacent to the respective option.

Beginning first with the option 1002, it may be selected to enable "hybrid" digital assistance as disclosed herein. For example, option 1002 may be selected to configure the first device to perform the logic discussed above in reference to FIG. 6 or to otherwise recognize input and execute a task/function based on input from a user as disclosed herein. The UI 1000 may also include a second option 1004 that is selectable to configure the first device to only use the assistance of a second device as disclosed herein if confidence in a recognition result recognized locally at the first device is below a confidence threshold.

Still further, the UI 1000 may include another option 1006 that is selectable to configure the first device to use filler words as described herein. The UI 1000 may also include an option 1008 that is selectable to configure the first device to progressively raise its confidence threshold for complying with various user requests based on successful identifications of voice input it performs locally as time goes on. In this way, as the first device's confidence grows in locally-produced recognition results as it learns a user's speech patterns and characteristics, the confidence threshold may be raised and hence waiting minimized for responses from a web-based server.

Even further, the UI 1000 may include an option 1010 that is selectable to configure the first device to issue/indicate conflicts or corrections as disclosed herein. Also, if desired the UI 1000 may include an option 1012 to configure the first device to use signal strength for determining a threshold wait time for waiting for a response from a second device as disclosed herein. The UI 1000 may also include an option 1014 to configure the first device to use a determined confidence level for determining a threshold wait time for waiting for a response from the second device as disclosed herein. Although not shown for simplicity, the UI 1000 may also include an option that is selectable to configure the first device to vary a threshold confidence level as disclosed herein as well.

Still further, the UI 1000 of FIG. 10 may include an option 1016 that is selectable to configure the first device to pre-fetch data/predicted outputs as disclosed herein. Also, the UI 1000 may include an option 1018 that is selectable to limit the pre-fetching of data based on a data download limit as disclosed herein.

Moving on from FIG. 10 and addressing pre-fetching data, it is to be understood that confidence in the pre-fetched data itself may also be considered. For example, if what is cached is a weather forecast, confidence in the cached weather forecast may decay over time as conditions change. Thus, the first device at which the weather forecast is cached may use a relatively longer wait time threshold for waiting for a weather update from the second device, and/or have a relatively lower confidence in the cached weather forecast, as time goes on and confidence in the cached weather forecast decays.

Furthermore, it is to be understood that pre-fetching as disclosed herein may be based on things other than historical usage data. For example, context of the operation of other devices in communication with the first device that are on the same local network as the first device may be used for predicting data to cache. As an example, if a smart stove is on and a timer on it has been activated, the first device may sync with the smart stove so that it can efficiently output a response to a user query for how much longer until the timer expires.

It is to also be understood that task and functions in accordance with present principles may be for any number of things. For instance, the task or function may be to adjust operation of a household "smart" appliance, to present audio video content to the user, to turn up or down the volume of audio output, to present information from Wikipedia requested by the user, to transcribe and send a text message or email, to provide directions to a destination, etc. Accordingly, it is to be generally understood that the functions the assistant is able to execute may be generally similar to those executed by Amazon's Alexa or Apple's Siri, for instance.

Before concluding, it is to be understood that although a software application for undertaking present principles may be vended with a device such as the system 100, present principles apply in instances where such an application is downloaded from a server to a device over a network such as the Internet. Furthermore, present principles apply in instances where such an application is included on a computer readable storage medium that is being vended and/or provided, where the computer readable storage medium is not a transitory, propagating signal and/or a signal per se.

It is to be understood that whilst present principals have been described with reference to some example embodiments, these are not intended to be limiting, and that various alternative arrangements may be used to implement the subject matter claimed herein. Components included in one embodiment can be used in other embodiments in any appropriate combination. For example, any of the various components described herein and/or depicted in the Figures may be combined, interchanged or excluded from other embodiments.

What is claimed is:

1. A consumer electronics (CE) device, comprising:
   at least one processor; and
   storage accessible to the at least one processor and bearing instructions executable by the at least one processor to:
   execute a digital assistant application communicating over a local area network (LAN);
   receive input for the digital assistant application to perform a task;
   determine, at the CE device and based on the input, the task indicated in the input;
   transmit at least a portion of the input to a remotely-located server different from the CE device;
   prior to executing the task, determine whether the CE device has at least a threshold level of confidence in correctly performing the task at the CE device without assistance from the remotely-located server;
   while online and responsive to a determination that the CE device has at least the threshold level of confidence in correctly performing the task at the CE device without assistance from the remotely-located server, execute the task at the CE device and using the digital assistant application without receiving a response from the remotely-located server; and
   responsive to a determination that the CE device has less than the threshold level of confidence in correctly performing the task at the CE device without assistance from the remotely-located server, wait at least a threshold amount of time for a response from the remotely-located server to receive from the server at least an execution of the task.

2. The CE device of claim 1, wherein the instructions are executable by the at least one processor to:
   while waiting for at least a portion of the threshold amount of time, provide audible output from the digital assistant application at the CE device.

3. The CE device of claim 2, wherein the audible output indicates acknowledgement of the task.

4. The CE device of claim 3, wherein the audible output indicates, subsequent to acknowledgement of the task, a name of a person.

5. The CE device of claim 1, wherein the instructions are executable by the at least one processor to:
   responsive to expiration of the threshold amount of time without receiving a response from the remotely-located server, execute the task at the CE device and using the digital assistant application without receiving a response from the remotely-located server.

6. The CE device of claim 5, wherein the instructions are executable by the at least one processor to:
responsive to receiving, after the expiration of the threshold amount of time, a response from the remotely-located server that conflicts with a determination regarding the task made by the CE device, issue a correction to the task that was executed at the CE device without receiving the response from the remotely-located server.

7. The CE device of claim 6, wherein the correction comprises audible output indicating the conflict.

8. The CE device of claim 1, wherein the threshold amount of time varies based on whether the CE device determines to use the remotely-located server for processing the input.

9. The CE device of claim 1, wherein the threshold amount of time varies based on a quality of signal for communication between the CE device and remotely-located server.

10. The CE device of claim 1, wherein whether the CE device determines to use the remotely-located server for processing the input is based on a quality of signal for communication between the CE device and remotely-located server.

11. The CE device of claim 1, wherein the remotely-located server is a web-based server.

12. The CE device of claim 1, wherein the input comprises voice input.

13. The CE device of claim 1, wherein the instructions are executable by the at least one processor to:
cache, at the CE device, data predicted to be requested from the digital assistant application.

14. The CE device of claim 13, wherein the data is predicted to be requested based on a history of previous data requests.

15. The CE device of claim 13, wherein the caching is at least attempted at predefined intervals.

16. The CE device of claim 13, wherein the amount of caching performed by the CE device is dependent at least in part on whether cached data will be applied against a data download limit associated with the CE device.

17. A method, comprising:
executing a digital assistant application communicating over a network;
receiving input for the digital assistant application to perform a task;
determining, at a device and based on the input, the task indicated in the input;
transmitting at least a portion of the input to a remotely-located server different from the device;
prior to executing the task, determining whether the device has at least a threshold level of confidence in correctly performing the task at the device without assistance from the remotely-located server;
while online and responsive to determining that the device has at least the threshold level of confidence in correctly performing the task at the device without assistance from the remotely-located server, executing the task at the device and using the digital assistant application without receiving a response from the remotely-located server; and
responsive to determining that the device has less than the threshold level of confidence in correctly performing the task at the device without assistance from the remotely-located server, waiting at least a threshold amount of time for a response from the remotely-located server to receive from the server an execution of the task.

18. The method of claim 17, comprising:
responsive to receiving, after the expiration of the threshold amount of time, a response from the remotely-located server that conflicts with a determination regarding the task made by the CE device, issuing a correction to the task that was executed at the CE device without receiving the response from the remotely-located server.

19. The method of claim 17, wherein the threshold amount of time varies based on a quality of signal for communication between the CE device and remotely-located server.

20. At least one computer readable storage medium that is not a transitory signal, the computer readable storage medium comprising instructions executable by at least one processor to:
execute a digital assistant application communicating over a network;
receive input for the digital assistant application to perform a task;
determine, at a device and based on the input, the task indicated in the input;
transmit at least a portion of the input to a remotely-located server different from the device;
prior to executing the task, determine whether the device has at least a threshold level of confidence in correctly performing the task at the device without assistance from the remotely-located server;
while online and responsive to a determination that the device has at least the threshold level of confidence in correctly performing the task at the device without assistance from the remotely-located server, execute the task at the device and using the digital assistant application without receiving a response from the remotely-located server; and
responsive to a determination that the device has less than the threshold level of confidence in correctly performing the task at the device without assistance from the remotely-located server, wait at least a threshold amount of time for a response from the remotely-located server to receive from the server an execution of the task.

* * * * *